Jan. 20, 1970   J. F. JOYSLEN   3,490,334
APPARATUS FOR CUTTING SHEET MATERIALS
Filed April 14, 1967   3 Sheets-Sheet 1
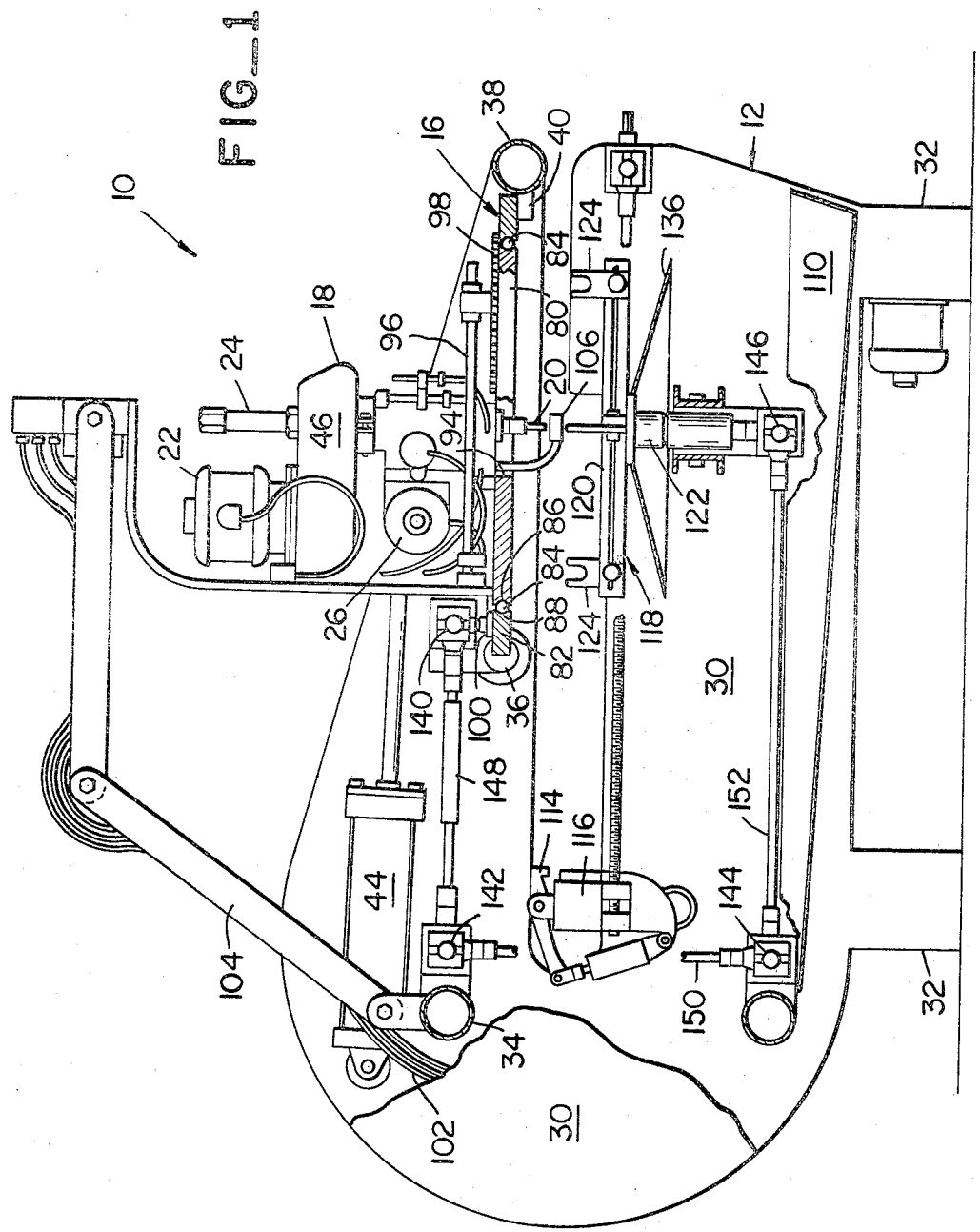
FIG_1
INVENTOR.
JACK F. JOYSLEN
BY
Owen, Wickersham & Erickson
ATTORNEYS

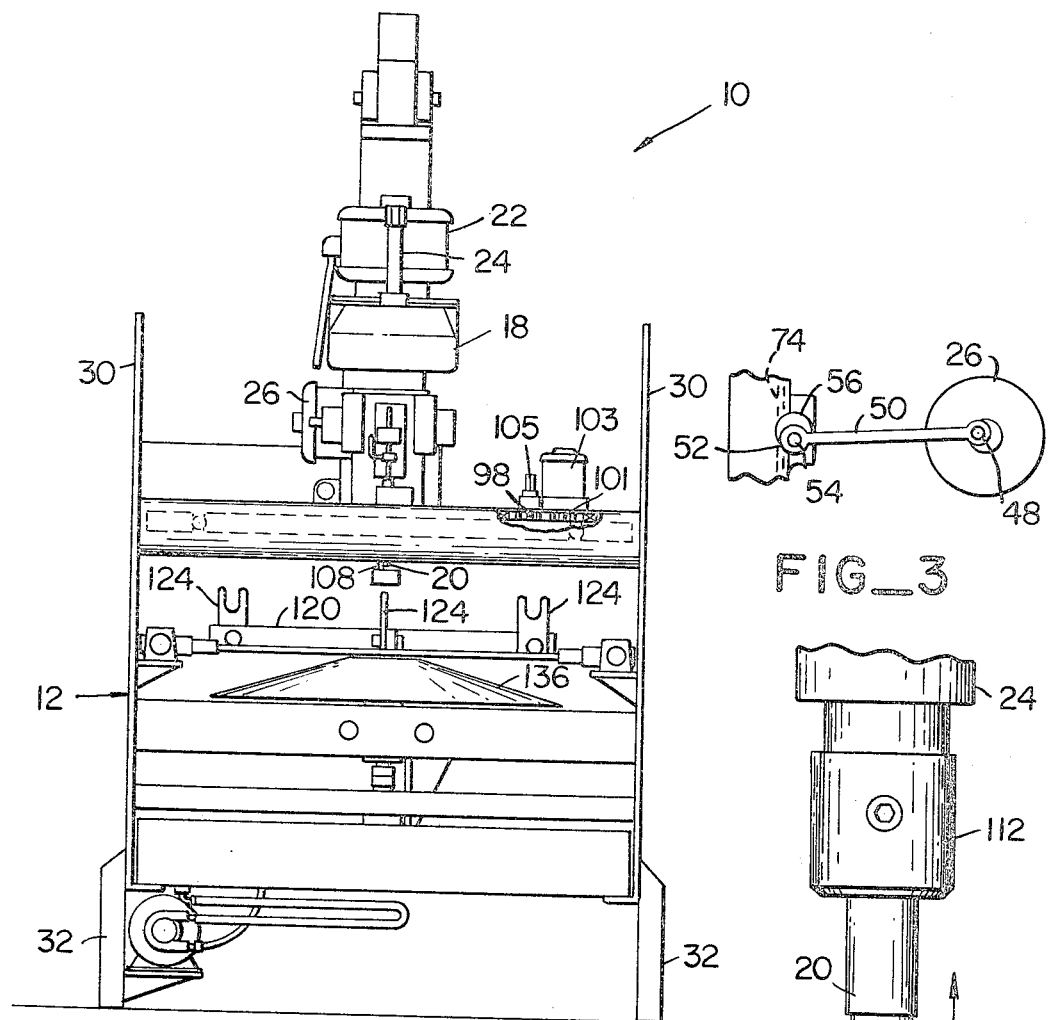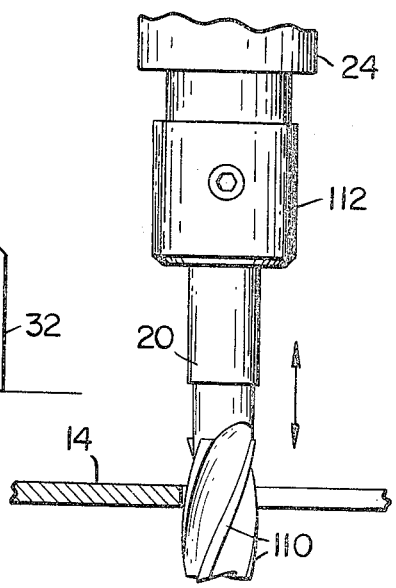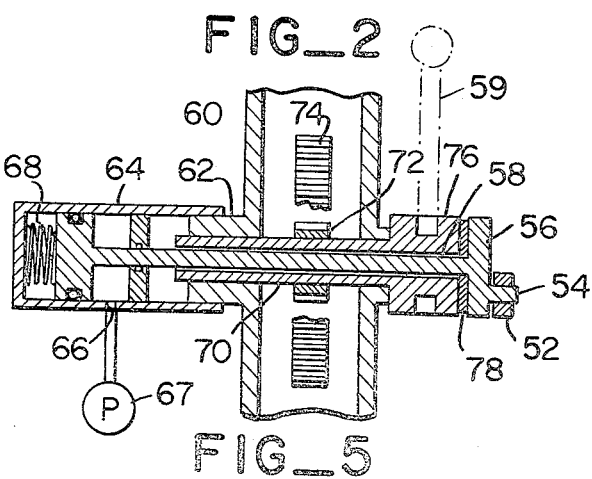

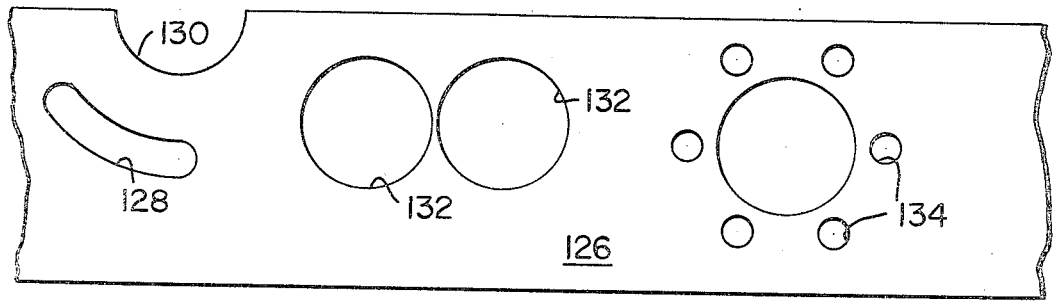
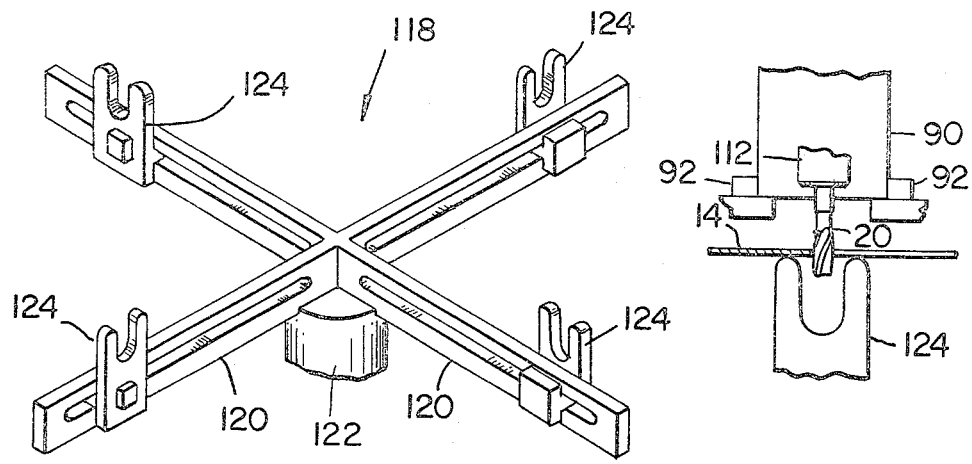

United States Patent Office
3,490,334
Patented Jan. 20, 1970

3,490,334
APPARATUS FOR CUTTING SHEET MATERIALS
Jack F. Joyslen, 26 Belmont Court,
Pleasant Hill, Calif. 94523
Filed Apr. 14, 1967, Ser. No. 630,925
Int. Cl. B23c 1/00, 3/00, 39/10
U.S. Cl. 90—14                                  9 Claims

ABSTRACT OF THE DISCLOSURE

An apparatus is disclosed which utilizes a rotary cutting tool that is oscillated at a constant rate as the tool is also rotated, thereby enabling the tool to cut holes or irregular contours in sheet metal at high feed rates and yet with unusual precision. A means is provided for disconnecting the oscillatory tool movement when it is desired to use the machine as a conventional rotary milling machine.

This invention relates to an apparatus and method for cutting or shaping sheet materials and particularly for cutting holes or contours of various shapes in relatively hard and tough sheet metal materials.

The cutting and shaping of large openings and contours of different shapes in sheet metals has long been a problem which, prior to the present invention, became particularly severe with respect to the use of the tougher, harder metals such as stainless steel and titanium. In the aircraft industry, for example, where the latter are widely used a serious need arose for an apparatus capable of cutting or shaping large holes or contours in such materials with a minimum of time, labor and tool expense. A general object of the present invention is to provide a method and an apparatus for utilizing it that will solve these problems.

One previous attempt to form holes of different sizes and shapes in relatively thin metal sheet or plate materials was to utilize a "nibbling" process wherein the material is held on a die and a nibbling tool employing a vertical stroke strikes and removes a small edge portion of the material. Although many such nibbling machines have been made and used the process has several disadvantages. Fundamentally, it is slow, and the work produced is relatively crude and unsatisfactory for certain products. For example, after the nibbling operation has been completed some form of grinding operation is usually required in order to produce smooth edges to close tolerances. Also, nibbling machines are generally heavy and cumbersome in order to produce and absorb the large amount of striking or punching energy required, particularly for thicker and tougher sheet materials. As a result, they are relatively expensive while being limited in their capabilities to perform other operations. A further disadvantage with "nibbling" is that the tool expense is high because of the impact nature of the nibbling operation which subjects the tool to severe stresses.

The use of rotary milling machines also proved to be unsatisfactory for cutting holes and contours in sheet metal. Even when used on relatively soft sheet metals, such as aluminum, the conventional milling process caused a severe and intolerable wear of the milling cutter and either made the operation impossible or produced irregular edges on the workpiece. Attempts to overcome the problem by reducing the feed speed and using the hardest cutters available failed to provide the desired results. In seeking a solution to the aforesaid problem I discovered that the short life of cutters employed on conventional milling machines in their use on sheet metal materials arose primarily because the chips produced by the conventional rotary cutters in sheet metal material became shorter as the thickness of the material decreased. Thus, as the cutter turned, the short chips that were produced tended to pile up and block the flutes instead of pushing themselves out of the flutes in the normal manner. This lack of chip removal prevented coolant from getting to the tool and caused friction and increased heat which eventually destroyed the tool cutting edges. In the present invention this problem has been overcome by providing a unique metal cutting machine and a new method of operation wherein a rotary milling cutter tool is oscillated axially as it simultaneously rotates when extended through the sheet material being cut. My invention accomplishes a complete and constant removal of the chips from the cutting tool even when used on sheet material as thin as shim shock and even though the rate of feed is unusually high.

Thus, another object of my invention is to provide a machine for use in making holes or contours in sheet materials which is operable to rotate a cutting tool and oscillate it axially at the same time while the tool is moved relative to a workpiece at a high feed rate.

Another object of my invention is to provide a new method for cutting through sheet metal materials which assures prolonged tool life while producing smooth edges to close tolerances and which entails the use of a combined rotary and oscillatory motion of the cutting tool as it is fed against the edge of the sheet material.

Another object of the present invention is to provide a machine which can be operated selectively as a conventional rotary milling machine on relatively thick material when the cutter is merely rotated and which can be operated to give the cutter an oscillatory motion as it also rotates when it is used on sheet metal materials.

Still another object of my invention is to provide a machine that can cut circles of various diameters in sheet metal material at a high production rate, within close dimensional tolerances and with a relatively small amount of tool wear.

A further object of the present invention is to provide a machine having a driving mechanism that imparts both a rotary and an oscillatory motion to a cutting tool and which enables the two forms of motion to be regulated and controlled separately.

Other objects, advantages and features of the invention will become apparent from the following detailed description of one embodiment thereof presented with the accompanying drawings, in which:

FIG. 1 is a view in side elevation of a machine embodying the principles of the present invention;

FIG. 2 is a view in front elevation of the machine shown in FIG. 1;

FIG. 3 is an enlarged fragmentary view showing some details of the oscillatory drive portion of the machine in FIGS. 1 and 2;

FIG. 4 is an enlarged fragmentary view of the cutter head section of my machine and illustrating broadly the method of the present invention;

FIG. 5 is an enlarged fragmentary plan view in section showing the clutch for the oscillatory drive section of my machine;

FIG. 6 is a view in perspective showing a spider support for cutting a circular hole in a workpiece on my machine;

FIG. 7 is an enlarged fragmentary view showing the milling cutter of my machine in operation with the spider support of FIG. 6;

FIG. 8 is a plan view showing diagrammatically the capabilities of my invention in its operation.

Referring to the drawing, FIG. 1 shows a machine 10 embodying the principles of my invention which can be used for cutting holes and contours of various shapes and sizes in different types of sheet materials, and particularly in sheet metals that are hard and tough such as titanium and stainless steel. In broad terms, the machine comprises a frame 12 forming a bed to which a workpiece 14, such as a piece of sheet metal, can be clamped. Above the workpiece is a supporting platform 16 which is movable in a horizontal plane. Mounted on the platform is a drive assembly 18 that supports a cutting tool 20 and provides it with both rotary and oscillatory motion in accordance with the present invention. On the upper end of the drive assembly is a first drive motor 22 for rotating a spindle 24 to which the tool is attached and a second drive motor 26 for simultaneously giving the cutter spindle an oscillatory movement as it rotates. The second drive motor is connected by a clutch 28 to the cutter spindle so that the oscillatory drive is separately controllable and can be discontinued while the tool continues to rotate, if desired.

In the embodiment shown, the platform 16 is primarily useful for cutting circular holes in sheet materials in a wide range of diameters, as will be described later. However, various other feed table arrangements could be used within the scope of the invention to provide means for moving the cutting tool horizontally in different directions either manually or by a machine feed control. In other words, my machine can be readily adapted for making openings or contours of any shape or pattern.

Describing now the machine 10 in greater detail, the frame 12 comprises a pair of upright, C-shaped members 30 which are supported on a plurality of base members 32 and connected together by a series of cross frame members. Rotatably supported within one tubular cross frame member 34 mounted inwardly from the ends of the upper jaw portions of the C-frame members is a shaft member 36 to which is connected one side of the platform 16. A front tubular frame member 38 extending between the outer ends of the upper portions of the members 30 at approximately the same level as the frame member 34 has a projecting longitudinal member fixed to its inner side forming a support 40 for the opposite side of the platform 16. An actuator 42 which may be hydraulic is connected to the rear end of the frame 12, and its ram 44 is connected to the platform. Thus, when it is necessary to provide for servicing or for insertion of a workpiece, the actuator can be operated to rotate the platform upwardly at an angle of about 45° about the axis of the shaft 36.

The spindle 24 for the cutting tool 20 is supported vertically in the drive assembly as is the first drive motor 22. A belt drive system within a housing 46 is used to connect the first motor to the spindle and is not shown in detail since such belt drive systems are conventional and well-known.

A system for interconnecting the second drive motor 26 with the spindle and imparting to it the oscillatory motion, according to my invention, is shown in greater detail in FIGS. 3 and 5. Extending from the output shaft 48 of the second motor is a crank arm 50 which is eccentrically connected thereto at one end. At its other end the crank arm has an integral ring portion 52 which fits over a pin 54 extending eccentrically from an end plate 56 on an oscillatory drive member 58. The latter extends through a spindle housing 60 comprising part of the drive assembly and has a cylindrical head 62 at its other end. This head fits snugly within a cylindrical housing 64 having an opening 66 adapted to admit air or hydraulic fluid supplied from a controllable source of pressure 67 and thereby cause an axial movement of the cylinder head and the drive member 56 which engages the oscillating drive system. A spring 68 is mounted within the housing against the head 62 to urge the oscillating drive member towards its disengaging position when no fluid pressure is being applied.

The shank of the oscillatory drive member fits loosely within a transverse sleeve 70, and within the spindle housing 60 a pinion gear 72 is fixed to the sleeve and has teeth that mesh with a gear rack 74 on the spindle 24. The sleeve 70 has a cylindrical head end 76 which is spaced from the end plate 56 of the oscillatory drive member 58 by a clutch plate member 78. When the cylindrical head of the drive member is forced toward the end of its housing 64 by a controlled fluid pressure through the port 66, the end plate 56 at the other end of the drive member pushes the clutch plate 78 against the head end 76 of the sleeve 70. This causes the torque of the drive member to be transmitted to the sleeve, and the constantly reversing angular oscillation of the drive member thus causes the sleeve to drive the spindle 24 up and down in a reversing axial movement.

The head end 76 of the sleeve 70 has a series of radial holes adapted to receive a removable handle 59. The latter may be selectively inserted in one of these holes to turn the sleeve member 70 manually, and with the clutch actuated this moves the spindle and its attached tool up and down within its quill by means of the pinion gear action in the gear rack 74. This spindle movement is done to accomplish the initial extension of the tool 20 through the sheet material. When the tool is properly positioned the handle is preferably removed before the oscillation drive is engaged.

The machine 10 has as one of its features a unique feed arrangement particularly adaptable for cutting circular holes in sheet materials. The platform 16 supporting the drive assembly and the cutting tool 20 comprises a rotatable circular disc 80 supported in a surrounding frame plate 82 that is fixed to the pivotal shaft 36. A series of ball bearings 84 are seated in an outer race 86 in the edge of disc 80 and a matching inner race 88 in the frame plate 82. The entire drive assembly 18 for the tool 20 is fixed to a bracket type mount 90 which is slidably supported on the disc 80 between a pair of track-like guiding bars 92 fixed to the disc 80 on opposite sides of a slot 94 which extends radially from the center thereof to a short distance from its outer edge (see FIG. 7). It is apparent that the mount and thus the drive assembly 18, may be moved on the disc 80 to position the tool 20 at a predetermined radius for a circular hole that is to be cut. The mount is then held firmly in place on the disc by means of a suitable clamp. A fine adjustment of the tool position may be accomplished by a jack screw 96 located adjacent to the slot on the disc and meshed with a gear rack in the mount 90.

When the cutting tool has been actuated to commence its combined rotary and oscillatory movement, its rate of feed may be controlled by the angular rotation of the circular disc 80 within the frame plate. To rotate the disc and thus move the cutting tool at the proper feed rate a large circular gear 98 is fixed to the upper surface of the disc 80 and is meshed with a drive gear 101 that is attached to the shaft of a feed motor 103 (FIG. 2) mounted on the frame plate 82. The speed of the disc and thus the feed speed of the cutting tool can be varied by varying the motor speed with a standard control to accommodate different types and thicknesses of materials. An auxiliary gear having a square sided shaft projection 105 and located near the drive gear 101 is available for turning the disc manually when desired.

Supporting a workpiece of sheet material beneath the circular disc 80 is a rotating spider 118 which is driven at the same speed as the circular disc 80. A pinion 138 mounted on the frame plate 82 and meshed with and driven by the large circular gear 98 is connected through a series of four bevel gear sets 140, 142, 144 and 146 and interconnecting shafts 148, 150 and 152 to a vertical post or shaft 122 supported in the lower portion of the frame 12. The spider shaft is vertically aligned with the central axis of the circular disc 80. The gearing provided between shaft 122 and the pinion 100 is designed so that the spider will rotate at the same speed as the circular disc 80.

As shown in FIG. 6, the spider comprises a pair of cross bars 120 connected together at right angles and mounted on the post 122. On each of the four arms of the support is an adjustable U-shaped member 124 that can be moved to and locked at a predetermined radial distance from the center of the support. When these latter members are properly positioned on the arms relative to the cutting tool, the lower end of the tool will extend downwardly and remain centered in a member 124 as it moves in its circular path through the sheet material, the spider moving at the same feed rate as the tool. (See FIG. 7.) Situated beneath the spider support in the embodiment shown is a chip deflector 136 having a frustoconical shape which serves to protect the bearing for the shaft 122.

Electrical conduits to the first and second drive motors on the drive assembly 18 designated by the numeral 102 are supported by an adjustable yoke 104 extending from the rear of the frame 12 to a position generally above the drive assembly. These wires are thus supported so that the disc 80 and thus the entire drive assembly 18 is free to turn its full 360° of travel as a complete unit without interfering with the feed rate of the cutting tool.

In order to protect the cutting tool during its operation at the unusual high feed rates which the present invention affords, a recirculating flow of coolant to the cutting tool must be maintained. In the present machine 10 the coolant is supplied at a dispensing ring 106 around the tool that also serves to hold down the sheet material being cut. The coolant to the ring is supplied through a conduit 108 that extends downwardly from the yoke. From the yoke the conduit extends to a pump (not shown) which leads coolant from a catch basin 110 beneath the cutting tool.

The unique method for cutting sheet materials which is employed by my machine 10 according to the present invention entails broadly the simultaneous rotation and oscillation of the cutting tool at predetermined rates after the tool is extended completely through the sheet material.

As shown in FIG. 4, a rotary type cutting tool of any conventional type, such as a rotary milling cutter, having spiral flutes 110 is held in place by a standard collet chuck 112 to which the spindle 24 is connected. When the tool is fed through sheet material with its rotary and oscillatory motion the small cutting chips formed are caused to move progressively out of the cutter flutes 110 instead of piling up and blocking them. The rate and stroke of oscillation can be varied depending on the rotary speed of the tool, the type of material being cut and its thickness, the feed speed, and the type of tool being used including the number of flutes. Generally, I have found that the number of oscillations of the tool per minute should be approximately one-third the number of its revolutions. For example, for sheet steel up to 0.125 inch in thickness, a tool rotating at 2,400 revolutions per minute should oscillate at around 800 strokes per minute, assuming a normal length of the oscillation stroke to be about 0.25 inch and an overall feed speed of 10 inches per minute. However, if a metal of a greater machinability, such as aluminum, is being cut the revolutions of the cutting tool can be increased by as much as four times, and at the same time the oscillation rate should also increase by a proportionate amount to maintain the desired three to one ratio of revolutions to oscillations.

When it is desired to perform a cutting operation with my apparatus and method according to the present invention, a sheet of material is first inserted in the jaws of the C-frame members and then locked in place by a clamping member. The latter has a movable upper jaw member 114 that is pivotally mounted relative to a fixed lower jaw 116 and is controllable through a suitable linkage or actuating cylinder to pivot towards the fixed jaw and grip the edge of the workpiece sheet.

As previously described, the cutting tool 20 is then moved to the proper position for making a hole of the desired radius by adjusting the mount 90 for the drive assembly in the guide members 92 on the disc 80. The cutting tool can now be activated to commence its combined rotary and oscillatory motion. A tool positioning lever is manipulated by a conventional control connected to the spindle to move the tool downwardly to initially penetrate the sheet material and position the tool well through the sheet material. The feed control on the circular supporting disc 80 is now operated to cause the latter to rotate, and the cutting tool 20 commences to move through the sheet material along its circular cutting path. If a conventional feed table is used, the tool can be moved in any desired direction.

The versatility of my machine is illustrated by a sheet 126 in FIG. 8 which shows typical examples of some of the various holes or contours that can be made by it in sheet material. The machine can produce high precision holes to close tolerances in sheet metal as thin as shim stock. It can produce arcuate openings as shown by the numeral 128, partial openings in the edge of a sheet 130, a plurality of openings 132 which may be separated by only a thin web, or a group of openings 134 arranged in a particular pattern. Moreover, when it is desired to do conventional milling operations on material thicker than sheet material the oscillation drive can be easily disengaged to allow the tool to rotate only.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A machine for cutting sheet materials, comprising:
   a generally cylindrical fluted cutting tool;
   spindle means connected to said tool;
   a drive assembly including a first drive means for rotating said spindle means and said tool at a predetermined constant rate;
   a second drive means for oscillating said tool axially at a constant stroke and frequency while it is also rotating, and including a sleeve located adjacent and transverse to said spindle means and a gear sector on said sleeve in mesh with a gear rack on said spindle means, an angularly oscillating drive shaft within said sleeve including an enlarged head portion at one end, and crank means connected eccentrically to said head portion and at its other end to a motor; clutch means interconnecting said second drive means to said spindle means and operable to disengage said second drive means and discontinue the oscillating movement of the cutting tool while it continues to rotate.

2. The machine as described in claim 1 wherein said clutch means comprises a friction plate located between said head portion of said drive shaft and said sleeve; and means causing said end portion and said sleeve to compress said clutch plate and thereby transmit angular oscillatory motion from said drive shaft to said sleeve and hence an axial oscillatory motion to said spindle means.

3. A machine for cutting sheet materials, comprising:
   a generally cylindrical fluted cutting tool;
   spindle means connected to said tool;
   a drive assembly including a first drive means for rotating said spindle means and said tool at a predetermined constant rate;
   a second drive means for oscillating said tool axially at a constant stroke and frequency while it is also rotating; and
   a main frame, a platform including an outer ring plate and an inner circular disc rotatably supported in said ring plate and having a transverse diametral slot; guide means adjacent said slot for retaining said drive assembly and securing it at a predetermined position corresponding to the desired radius of an opening to be cut in a sheet of material.

4. A machine as described in claim 3 including means for tilting said platform to provide access to the workpiece.

5. The machine as described in claim 3 including means for rotating said disc and said drive assembly within said ring plate.

6. The machine as described in claim 5 including a rotatable spider-like support means for a workpiece located beneath said circular disc; and means for rotating said support means at the same angular rate as said circular disc.

7. The machine as described in claim 6 wherein said spider-like support means includes a plurality of radially extending arms; and a U-shaped member on each arm within which the rotating and oscillating tool can extend during the cutting of a sheet which is supported on said U-shaped members.

8. A machine for cutting holes and contours of predetermined shapes in sheet materials, comprising:
   a frame;
   a vertically adjustable drive assembly supported on said frame including a spindle;
   a fluted, generally cylindrical tool attached to the lower end of said spindle;
   a first drive means in said drive assembly for rotating said spindle and said tool;
   a second drive means in said drive assembly connected to said spindle for giving it an axial oscillatory motion at a predetermined stroke and frequency;
   clutch means for disconnecting said second drive means while said first drive means continues to rotate said tool; and
   feed means for moving said drive assembly laterally, thereby moving said tool transversely through the plane of said sheet material along a predetermined path as it both rotates and oscillates, said feed means comprising a circular disc having a radially extending slot; a ring plate for supporting said disc; means for rigidly supporting said drive assembly on said circular disc so that said tool extends downwardly through said slot; means for holding a piece of sheet material beneath the circular disc; and means for driving said circular disc at a constant rate.

9. The machine as described in claim 8 including a rotatable workpiece support means beneath said circular disc and means for driving said support means at the same feed rate as said tool.

References Cited

UNITED STATES PATENTS

| | | | |
|---|---|---|---|
| 839,464 | 12/1906 | Freese | 143—133.3 |
| 2,195,052 | 3/1940 | Wallace. | |
| 3,003,372 | 10/1961 | Findley | 77—32.3 |

ANDREW R. JUHASZ, Primary Examiner

G. WEIDENFELD, Assistant Examiner

U.S. Cl. X.R.

77—32.3; 90—15; 143—133